US009917672B2

(12) United States Patent
Jensen et al.

(10) Patent No.: US 9,917,672 B2
(45) Date of Patent: Mar. 13, 2018

(54) WIRELESS DISTRIBUTED ANTENNA MIMO

(71) Applicant: TECHNICAL UNVERSITY OF DENMARK, Kongens Lyngby (DK)

(72) Inventors: Jesper Bevensee Jensen, Albertslund (DK); Jes Broeng, Birkerød (DK); Kristian Nielsen, Kongens Lyngby (DK); Jesper Laegsgaard, Virum (DK)

(73) Assignee: Technical University of Denmark, Kongens Lyngby (DK)

( * ) Notice: Subject to any disclaimer, the term of this patent is extended or adjusted under 35 U.S.C. 154(b) by 17 days.

(21) Appl. No.: 14/909,863

(22) PCT Filed: Aug. 11, 2014

(86) PCT No.: PCT/EP2014/067157
§ 371 (c)(1),
(2) Date: Feb. 3, 2016

(87) PCT Pub. No.: WO2015/018947
PCT Pub. Date: Feb. 12, 2015

(65) Prior Publication Data
US 2016/0182181 A1    Jun. 23, 2016

(30) Foreign Application Priority Data

Aug. 9, 2013 (EP) .................................... 13179950

(51) Int. Cl.
*H04J 14/04* (2006.01)
*H04B 10/2581* (2013.01)
(Continued)

(52) U.S. Cl.
CPC ............ *H04J 14/04* (2013.01); *H04B 7/0413* (2013.01); *H04B 7/0697* (2013.01);
(Continued)

(58) Field of Classification Search
CPC .................. H04B 10/2575; H04B 10/2581
See application file for complete search history.

(56) References Cited

U.S. PATENT DOCUMENTS

| 4,829,598 A | 5/1989 | Auracher et al. |
| 4,856,093 A | 8/1989 | Mohr |

(Continued)

FOREIGN PATENT DOCUMENTS

| AU | 2009201717 | 12/2009 |
| CN | 102945707 | 2/2013 |

(Continued)

OTHER PUBLICATIONS

You et al., "Cooperative Distributed Antenna Systems for Mobile Communications", IEEE Wireless Communications, 2010.*
(Continued)

*Primary Examiner* — Shi K Li
(74) *Attorney, Agent, or Firm* — Hamilton, Brook, Smith & Reynolds, P.C.

(57) ABSTRACT

The present disclosure relates to system applications of multicore optical fibers. One embodiment relates to a base transceiver station for a wireless telecommunication system comprising a plurality of antenna units arranged in a MIMO configuration and adapted for transmission and/or reception of radio-frequency signals, an optical transmitter in the form of an electro-optic conversion unit for each of said plurality of antenna units, each electro-optic conversion unit adapted for converting an RF signal into an optical signal, a plurality of a single core optical fibers for guiding the optical signals, and at least one first space division multiplexing (SDM) unit adapted for multiplexing said single core optical fibers into respective individual cores of a multicore fiber, or into respective individual modes of a multimode fiber.

16 Claims, 6 Drawing Sheets

(51) Int. Cl.
  *H04J 14/02* (2006.01)
  *H04B 7/0413* (2017.01)
  *H04B 7/06* (2006.01)
  *H04B 10/2575* (2013.01)

(52) U.S. Cl.
  CPC ... *H04B 10/2581* (2013.01); *H04B 10/25753* (2013.01); *H04J 14/02* (2013.01)

(56) References Cited

U.S. PATENT DOCUMENTS

| | | | |
|---|---|---|---|
| 5,060,312 | A | 10/1991 | Delavaux |
| 5,142,402 | A | 8/1992 | Tsushima et al. |
| 5,473,463 | A | 12/1995 | van Deventer |
| 7,199,870 | B2 | 4/2007 | Andrekson et al. |
| 2004/0017785 | A1 | 1/2004 | Zelst |
| 2011/0274435 | A1* | 11/2011 | Fini .............. G02B 6/02042 398/139 |
| 2011/0280517 | A1 | 11/2011 | Fini et al. |
| 2012/0163801 | A1 | 6/2012 | Takenaga et al. |
| 2012/0189301 | A1* | 7/2012 | Ghiggino .......... H04J 14/0227 398/34 |
| 2013/0236180 | A1* | 9/2013 | Kim .............. H04J 14/0236 398/72 |

FOREIGN PATENT DOCUMENTS

| | | |
|---|---|---|
| EP | 0145972 A1 | 6/1985 |
| EP | 2365654 | 9/2011 |
| GB | 2172766 | 9/1986 |
| JP | 2012235343 | 11/2012 |
| WO | WO 2002/090275 | 11/2002 |
| WO | WO 2004/054138 | 6/2004 |
| WO | WO 2011061735 | 5/2011 |

OTHER PUBLICATIONS

Chung Y. C. et al., "Novel FSK heterodyne single-filter system using no IF frequency lock"; IEEE Photonics Technology Letters, IEEE Service Center, Piscataway, NJ, US; vol. 1, No. 6, pp. 140-141; the whole document (1989).

Emura et al., "Novel Optical FSK_Heterodyne single Filter Detection System Using a Directly Modulated DFB-Laser Diode", Electronics Letters, vol. 20, No. 24, pp. 1022-1023, XP002738832, the whole document (1984).

Emura K., et al., "4 to 5 Gb/s phase diversity homodyne detection experiment."; pp. 57-60 (1988).

Ezra I., et al., "Coherent detection in optical fiber systems"; Optics Express, vol. 16(2), (2008).

Gordon, G., et al., "Demonstration of Radio-over-Fibre Transmission of Broadband MIMO over Multimode Fibre using Mode Division Multiplexing"; ECOC (2012).

Jensen, J. B. et al., "VCSEL Based Coherent PONs."; IEEE Journal of Lightwave Technology, (2011).

Jensen, J. B., et al., "Bidirectional 5 Gbit/s 40 km Coherent Detection VCSEL Based Transmission System."; Optical Society of America (2010).

Kikuchi K., "Coherent Optical Communications: Historical Perspectives and Future Directions"; Chapter 2 of M. Nakazawa et al., High Spectral Density Optical Communication Technologies, Optical and Fiber Communications Reports 6, 2010.

Korotky, S. K., "Price-points for components of multi-core fiber communication systems in backbone optical networks", IEEE/OSA Journal of Optical Communications and Networking, vol. 4, No. 5, pp. 426-435 (2012).

Krummrich, P. M., "Spatial multiplexing for high capacity transport", Optical Fiber Technology, vol. 17, No. 5, pp. 480-489 (2011).

Rodes, R., et al., "1.3 μm all-VCSEL low complexity coherent detection scheme for high bit rate and high splitting ratio PONs."; OSA/OFC/NFOEC (2011).

Rodes, R., et al., "10 Gb/s Real-Time All-VCSEL Low Complexity Coherent scheme for PONs."; OFC/NFOEC Technical Digest (2012).

Romaniuk, R. S., et al., "Multicore optical fiber components"; Proceedings of SPIE, vol. 722, pp. 117-124 (1986).

Yao, X. S., et al., "All-optic scheme for automatic polarization division demultiplexing"; Optics Express, vol. 15(12) (2007).

* cited by examiner b) Constant modefiled diameter tapered multicore fiber coupler a) MCF-SMF coupling sleeve MCF-SMF coupling sleeve
End facet dimensions

WIRELESS DISTRIBUTED ANTENNA MIMO

This application is the U.S. National Stage of International Application No. PCT/EP2014/067157, filed Aug. 11, 2014, which designates the U.S., published in English, and claims priority under 35 U.S.C. § § 119 or 365(c) to European Patent Application No. 13179950.4, filed Aug. 9, 2013. The entire teachings of the above applications are incorporated herein by reference.

The present disclosure relates to system applications of multicore optical fibers.

BACKGROUND OF INVENTION

In order to meet the increasing demands for broadband wireless access, mobile service providers are now deploying distributed antenna multiple input multiple output (MIMO) systems. MIMO systems typically use the same radio frequency spectrum for several antennas which work together to cooperatively detect the signals. This enhances reach and capacity of wireless signals at the cost of increased signal processing complexity. Multicore fibers have recently gained considerable attention within the telecom industry as a way of reducing the footprint of optical data links.

In traditional radio-over-fiber/wireless-over-fiber systems a laser is driven by the signal received from the antenna, and the optical signal is transmitted over a fiber link to the central station. For the downlink, the radio-frequency signal is generated at the central station and transmitted over the fiber link to the antenna station, where it is photodetected and amplified before being fed to the antenna. Usually, each antenna will be connected to the central station via a duplex fiber link.

Optical communication systems incorporating a MIMO configuration employing one or more multicore fibers in the backhaul link are disclosed in the prior art. US 2012/163801 discloses an optical fiber communication system enabling achievement of a large-capacity optical communication with a small number of optical fibers. The communication system includes an optical transmitter transmitting a plurality of optical signals in parallel through the respective cores of a multicore fiber, and an optical receiver receiving the optical signals output in parallel from the respective cores of the multicore fiber. The optical transmitter and the optical receiver thereby essentially form a MIMO optical communication employing a multicore fiber.

SUMMARY OF INVENTION

A first aspect of the present disclosure relates to a base transceiver station for a telecommunication system comprising a plurality of antenna units arranged in a MIMO configuration and adapted for transmission and/or reception of radio-frequency signals, an optical transmitter in the form of an electro-optic conversion unit for each of said plurality of antenna units, each electro-optic conversion unit adapted for converting an RF signal into an optical signal, a plurality of a single core optical fibers for guiding the optical signals, and at least one first space division multiplexing (SDM) unit adapted for multiplexing said single core optical fibers into respective individual cores of at least one multicore fiber, or alternatively, into individual modes of at least one multimode optical fiber. The telecommunication system is preferably wireless, e.g. a digital mobile telecommunication system. The at least one first space division multiplexing unit may for example be based on optical fiber or waveguide technology or a combination hereof.

By providing an SDM unit, multicore fiber (MCF) can be employed for the transmission from the base transceiver station to a central station. If directly modulated lasers (DML) are used in the antenna transceivers, each antenna unit can be "simplified" to the ideal case of a directly modulated (un-cooled) laser coupled to standard singlecore fiber (SCF). At the foot of the antenna, the signals from the individual antennas can be multiplexed into a multicore fiber by means of the SDM unit.

A second aspect of the present disclosure relates to a radio-over-fibre MIMO communication system A radio-over-fibre MIMO communication system comprising one or more base transceiver stations comprising a plurality of antenna units, an optical transmitter for converting RF signals from the antenna units into optical signals, and at least one first multiplexing unit for multiplexing said optical signals into respective individual cores of a multicore fiber, or into respective individual modes of a multimode fiber, and a central unit accommodating at least one demultiplexing unit adapted for demultiplexing the individual cores of the multicore fiber, or for demultiplexing the individual modes of a multimode fiber, an optical receiver for receiving the optical signals output from said at least one demultiplexing unit, and at least one processing unit for processing the signals from said optical receiver, wherein said optical transmitter and said optical receiver are configured to perform a MIMO communication, and wherein each of said one or more base transceiver stations are connected to the central unit by means of at least one backhaul multicore or multimode optical fiber. The base transceiver station may be the base transceiver station as described herein.

The use of SDM MIMO distributed antenna systems greatly enhances the coverage and capacity of wireless transmission radio-over-fiber (RoF) systems, because SDM MIMO radio-over-fiber/wireless-over-fiber provides an ingenious way of moving the signal processing from the antenna base station (base transceiver station) to the central office, thereby reducing cost and complexity, because the signal from each individual antenna unit can be transmitted in individual cores of the backhaul multicore fiber, i.e. the respective radio signals from the antenna units are converted to an corresponding optical signals and transmitted in parallel from the optical transmitter through the individual cores of the multicore fiber, or in individual modes of a multimode fiber. Therefore, a new communication system is provided that can result in radical cost reductions and significantly decreased power consumption at the base transceiver station and move as much signal processing as possible to the central station. An example of this is illustrated in FIG. 1 where twelve wireless signals from the twelve antenna units are combined in a single multicore fiber and transmitted optically to the central station for further signal processing.

Although MIMO already now is widely employed, the use of MIMO may be a key aspect of future wireless communication systems, e.g. 5G. There are different application of MIMI, e.g. "coordinated MIMO", "mmWave MIMO" and "massive MIMO", and especially the latter may benefit substantially if used together with the presently disclosed base transceiver station and communication systems, e.g. for implementation in cellular networks. In massive MIMO (also referred to as "Large-Scale MIMO" or "Large-Scale Antenna Systems") a very high number of antennas is provided to multiplex messages for several devices on each time-frequency resource, focusing the radiated energy toward the intended directions while minimizing intra- and inter-cell interference. The number of antennas at the base station is much larger than the number of devices per signaling resource. Having many more base station antennas than devices renders the channels to the different devices quasi-orthogonal and very simple spatial multiplexing/de-multiplexing procedures quasi-optimal. The favourable action of the law of large numbers smoothens out frequency dependencies in the channel and, altogether, huge gains in spectral efficiency can be attained. Single-user MIMO is constrained by the limited number of antennas that can fit in certain mobile devices. In contrast, there is almost no limit on the number of base station antennas in massive MIMO. However, Massive MIMO may require major architectural changes, e.g. in the design of base transceiver stations. The presently disclosed use of space division multiplexing in multicore or multimode fibers may be therefore a key aspect in the future deployment of massive MIMO.

A third aspect of the present disclosure relates to an optical access network (FTTx) system comprising at least one central office multi-channel transceiver adapted for transmission and/or reception of optical signals, an optical transmission link comprising at least one optical fiber with one or more cores, a plurality of single core optical fibers, at least one passive power splitter adapted to optically connect the optical transmission link with the single core fibers, and a plurality of subscriber transceivers adapted for transmission and/or reception of optical signals, wherein the at least one central office multi-channel transceiver and the subscriber transceivers are adapted for emission and/or detection of coherent light.

DETAILED DESCRIPTION OF THE INVENTION

Figure 1:
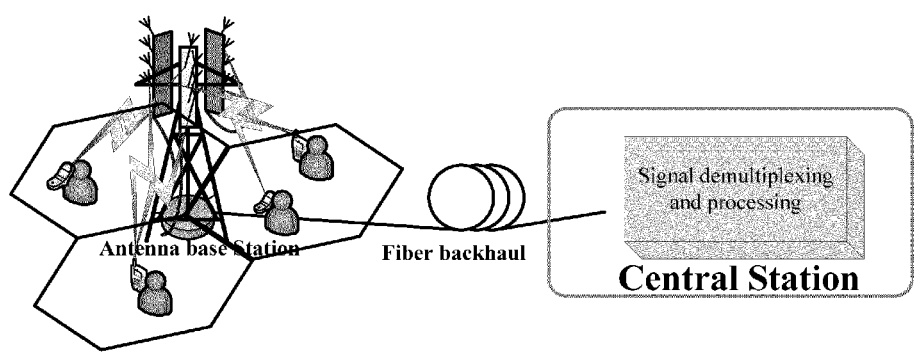
FIG. 1 shows an illustration of a multi-antenna MIMO Radio-over-Fiber system.
Figure 2:
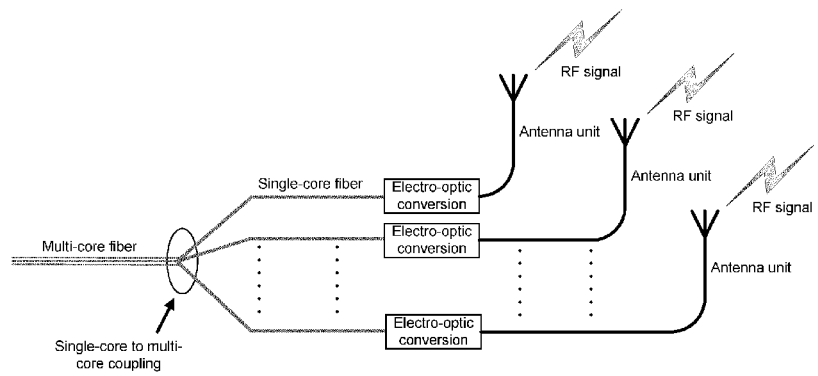
FIG. 2 shows an Illustration of the MIMO multi-core wireless-over-fiber signal aggregation scheme.
Figure 3:
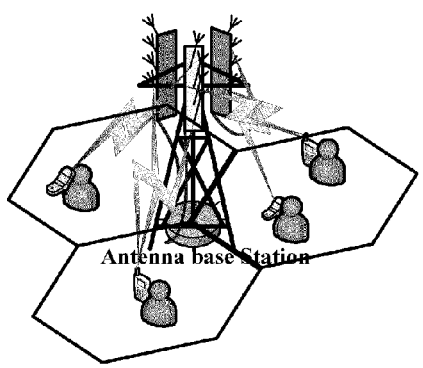
FIG. 3 shows an exemplary illustration of a three times 4×4 MIMO multi-core wireless over fiber antenna configuration.

As stated above the first aspect of the present disclosure relates to a base transceiver station for a digital mobile telecommunication system. In a further embodiment of the invention the base transceiver station further comprises at least one multicore optical fiber in optical connection with said at least one first space division multiplexing unit. Thus, a multicore fiber may be part of the base transceiver station.

In a further embodiment of the invention the base transceiver station comprises at least one multimode optical fiber in optical connection with said at least one first space division multiplexing unit. Thus, a multimode fiber may be part of the base transceiver station.

In a further embodiment of the invention each electro-optic conversion unit comprises a directly modulated laser (DML), preferably an un-cooled DML which generally have a lower cost. In another embodiment of the invention each electro-optic conversion unit comprises a vertical cavity surface emitting laser (VCSEL), preferably an un-cooled VCSEL.

In a further embodiment of the invention each electro-optic conversion unit comprises an externally modulated laser.

Optical transmission is preferably provided in the C-band and/or in the L-band and/or around 1310 nm. Furthermore, the single core fibers and/or the individual cores of the multicore fibers are adapted for single mode propagation at the corresponding transmission wavelengths. The multicore fibers as herein described may comprise more than 2 individual cores, or more than 3, 4, 5, 6, 7, 8, 9, 10, 11, 12, 13, 14, 15, 16, 17, 18, 19, or more than 20 cores, or less than 20, 19, 18, 17, 16, 15, 14, 13, 12, 11, or less than 10 cores.

In a further embodiment the plurality of optical signals corresponding to the plurality of antenna units are transmitted at the same wavelength. E.g. identical (low cost) lasers, such as DMLs, can be provided at the base transceiver station. This can be made possible with the MIMO configuration because the signal from each antenna unit can be delivered all the way to a central signal processing location in an individual fiber core, i.e. alone and independently of the other signals, i.e. all signals can be transmitted in parallel through multicore fiber. Thus, since the signals in the optical domain can be transmitted through individual fiber cores, the same optical wavelength and the same RF frequency can be used with insignificant optical crosstalk.

Similarly, the MIMO configuration allows for the plurality of radio-frequency signals corresponding to the plurality of antenna units to be transmitted at the same carrier RF frequency, due to the fact that a one-to-one correspondence may be provided between an antenna unit and the output at the central processing location.

However, the present communication scheme may still be combined with WDM technology. Thus, in a further embodiment a plurality of wavelength division multiplexing units are located between the electro-optic conversion units and said at least one first space division multiplexing unit, each of the wavelength division multiplexing units adapted for wavelength multiplexing at least two of the optical signals into one single core of an optical fiber. Coarse wavelength division multiplexing (CWDM) may be employed to keep the cost as low as possible.

In a further embodiment the outer circumferences of the plurality of cores in the multicore fiber are covered with a common cladding.

The technology of the space division multiplexing units may be based on optical fibers only, i.e. the optical signal are kept inside optical fibers along the space division multiplexing coupling. Fiber technology may be the key technology to bring the cost down and reduce connection losses when employing multicore fibers. Thus, in a further embodiment of the first and/or the second space division multiplexing unit comprises a tapered fiber coupler and/or a fused fiber coupler, also referred to as a fan-in/fan-out component that provides the optical connection between a plurality of single core fiber (SCF) and a single multicore fiber (MCF).

The existing technology for coupling from SCF to MCF is based on very precise (micrometer-scale tolerance) diamond grinding and polishing of several individual SCFs that are fused together to form an MCF to SCF "fan-out". This requires highly accurate and very careful processing of each individual device, and is therefore not suitable for low-cost high volume production.

US 2011/280517 discloses a tapered fiber coupler based on optical fibers adapted for low-loss coupling between a plurality of fused and tapered single core optical fibers and a single multicore fiber. A low-loss coupling is provided by the single-core fibers being adapted to maintain their modal properties across the tapering, i.e. the mode-field diameter of the individual cores is substantially constant across the coupling thereby avoiding mode mismatch in the tapered coupler. This is achieved by employing a double cladding structure of the individual cores of the single-core fiber in the tapered coupler. Towards the multicore end of the optical component the SCF cores are arranged in a configuration matching that of the cores of a MCF.

Tapered fiber couplers can alternatively be based on well-known 'stack-and-draw' manufacturing where a high number of devices can be manufactured from a single preform avoiding the fusing process disclosed in US 2011/270517. This may result in a greatly reduced cost of multicore fiber based optical communication systems.

Figure 6:
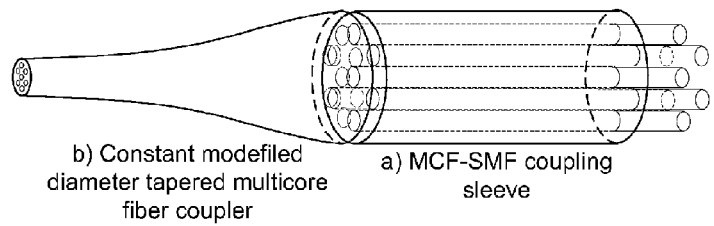
FIG. 6 is a schematic illustration of a SDM component.

An example of such a tapered fiber coupler is illustrated in FIG. 6. The tapered fiber coupler comprises two sections a) and b). A sleeve (section a, to the left in FIG. 6) provides alignment of three or more single-core fibers (SCFs) to three or more cores of a tapered multicore coupler (section b, to the right in FIG. 6). The cores of the tapered multicore coupler (TMC) are preferably non-concentric and non-overlapping. Similarly, the cores of the SCFs are preferably non-concentric and non-overlapping. The alignment refers to light being able to couple from a single core of a single-core fiber to a single core of the TMC with an efficiency of 50% or more. Preferably, the tapered waveguide b) is designed to ensure that the mode field diameter is preserved along the coupler for the individual cores. The sleeve acts to fixate singe-core fibers such that light can be coupled from these fibers to the individual cores of the multicore tapered waveguide.

Figure 7:
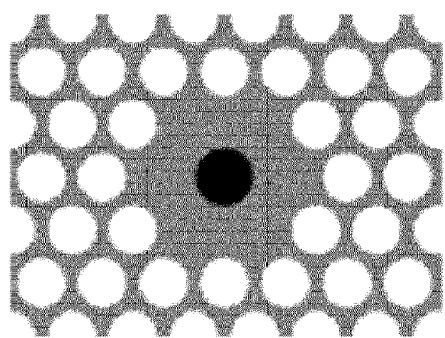
FIG. 7 shows a schematic example of the cross-section of an individual core including parts of its cladding in a TMC.
Figure 8:
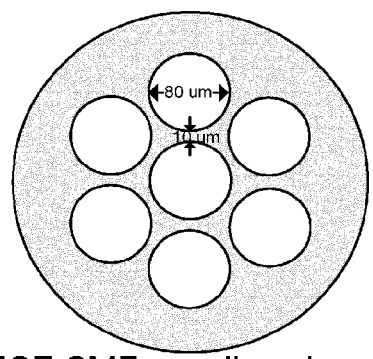
FIG. 8 shows a schematic example of the cross-section of a sleeve with indication of exemplary dimensions.
Figure 9:
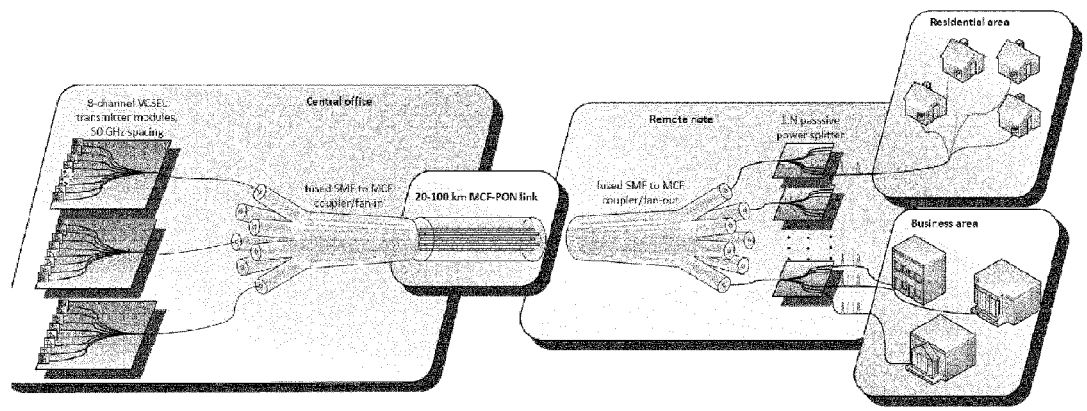
FIG. 9 is an illustration of an optical access network enabled by a backhaul multicore fibre and coherent VCSEL technology.
Figure 10:
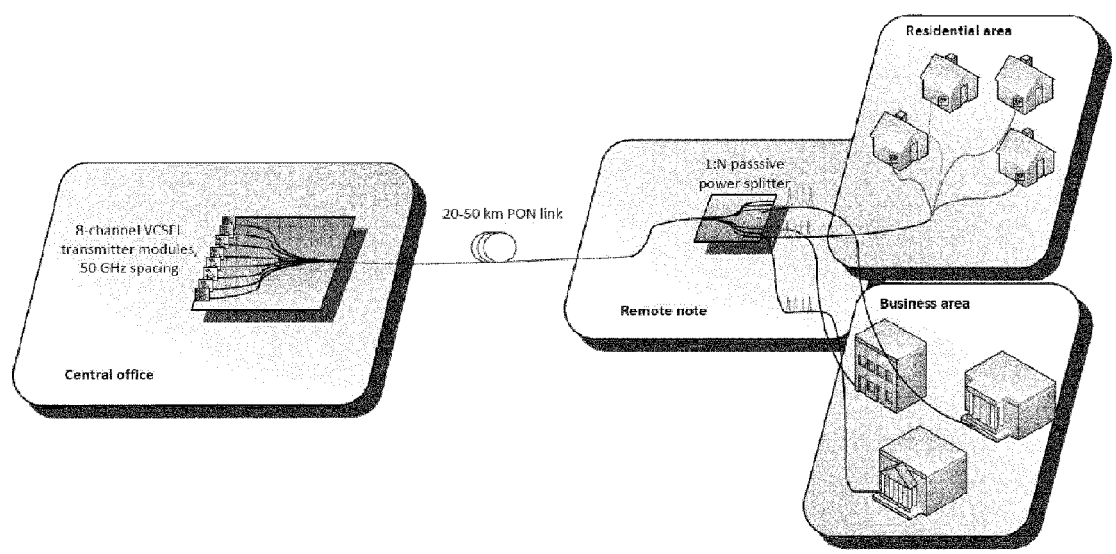
FIG. 10 is an illustration of an optical access network (FTTx) communication system employing 8-channel WDM scheme.

A cross-section of an exemplary tapered multicore coupler (section b in FIG. 6) is schematically illustrated in FIG. 7 and a cross-section of an exemplary sleeve (section a in FIG. 6) is schematically illustrated in FIG. 8. Preferably, the tapered multicore coupler gradually decreases the centre-to-centre distance (pitch) between adjacent cores from a comparable centre-to-centre distance between cores of adjacent SCFs in the sleeve section. Typically pitches are in the range of 80 to 300 micron (dependent on fiber type), but a wider range is also possible.

Preferably, the tapered multicore coupler (TMC) is designed in such a way that the mode field diameter of the individual cores remains constant through the device, in order to reduce or eliminate excess loss due to mode mismatch. As an example, the preservation of the mode field diameter is achieved by employing a double cladding structure for the individual cores of the TMC. In a thick end of the TMC, the inner core will be matched to the SCF core size, in the down tapered narrow end, the inner cladding will be matched to the MCF core size. The inner core reduces in diameter during the tapering and thereby may lose its ability to act as a separate waveguide. Alternatively, the TMC is designed to provide a smaller or larger mode field diameter at the thin end of the TMC. For example, the mode field diameter of the individual cores of the TMC at the thin end may be designed to match the mode field diameters of integrated optical waveguides that are typically smaller than the SCFs, or to match mode-field diameters of laser sources such as VCSELs or VCSEL arrays, or to match the mode-field diameters of large-mode area multi-core fibers (such as for high data rate long-haul transmission fibers).

Communication System

As stated previously a second aspect of the invention relates to a radio-over-fibre MIMO communication system comprising one or more of the herein described base transceiver stations.

Figure 4:
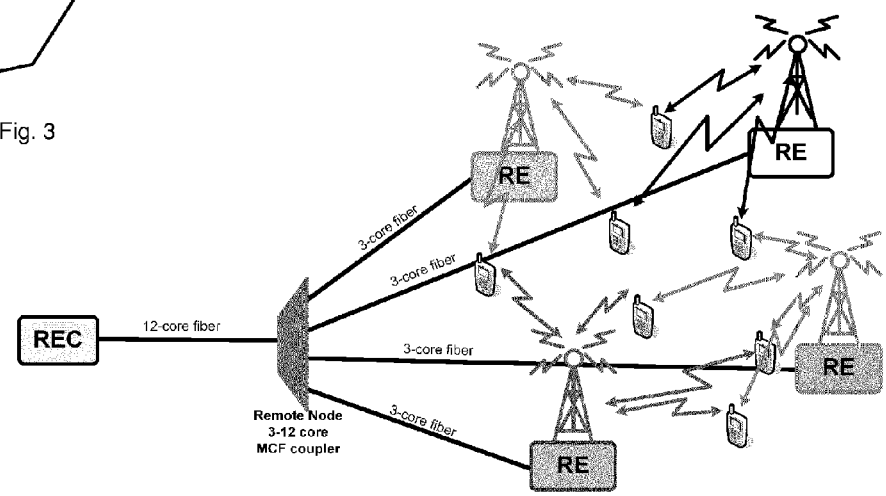
FIG. 4 shows a combined WDM and core division multiplexed multicore MIMO wireless over fiber architecture.
Figure 5:
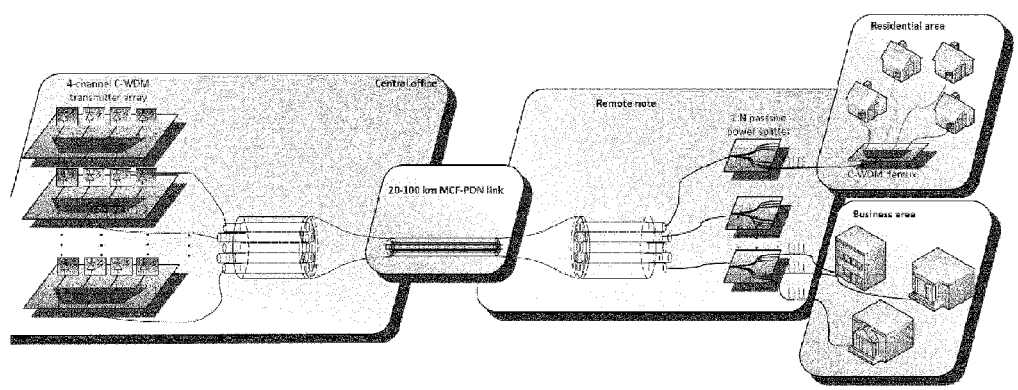
FIG. 5 is an illustration of an optical communication system employing 4-channel CWDM scheme and backhaul multicore fiber transmission.

However, in densely populated urban areas, such as a city square, where several base transceiver stations work together, e.g. to secure broadband wireless access to the users, the aggregated number of signals may be significant. By introducing the possibility of combining WDM with space division multiplexing (SDM) in multicore fiber, a significant reduction in complexity can be achieved. Thus, a further embodiment relates to a radio-over-fibre MIMO communication system comprising a plurality of base transceiver stations as herein described employing a plurality of wavelength division multiplexing units located between the electro-optic conversion units and said at least one first space division multiplexing unit, each of the wavelength division multiplexing units adapted for wavelength multiplexing at least two of the optical signals into one single core of an optical fiber, and at least one second space division multiplexing unit adapted for multiplexing the individual cores of the multicore optical fibers from each of said base transceiver stations into respective individual cores of said at least one backhaul multicore fiber. An example of such a system is illustrated in FIG. 4. Coarse wavelength division multiplexing (CWDM) may be employed to keep the cost as low as possible. The plurality of base transceiver stations may employ the same carrier frequencies for the radio-frequency signals. Further, the plurality of base transceiver stations may employ the same wavelength division multiplexing scheme. The base transceiver station(s) may be located remotely and whereas the central unit is preferably located at a central station, thereby moving the signal processing to a central location.

EXAMPLES

Example 1—Base Transceiver Station in MIMO Configuration Using Multicore Optical Fiber A multicore MIMO wireless-over-fiber system as described herein is independent on the detailed design of the MIMO wireless system; it can be employed in several different versions. An example is provided in FIG. 1 where a 360 degrees wireless coverage is provided by employing three antenna arrays each covering 120 degrees and each consisting of four antenna units in a 4×4 MIMO configuration. In total, twelve signals are being transmitted over fiber to the central station from this single base transceiver station. The twelve optical signals are spatially multiplexed at the foot of the base transceiver station, and transmitted over a 12-core multicore fiber to the central station.

Example 2—Combined Wavelength Division Multiplexing and Core Division Multiplexing In a densely populated urban area, such as a city square, where several such antenna units work together to secure broadband wireless access to the users, the aggregated number of signals may be very high. By introducing the possibility of combining coarse WDM with space division multiplexing in multicore fiber, a significant reduction in complexity can be achieved. This architecture is illustrated in FIG. 4 where four base transceiver stations handle signals from twelve individual antenna units each, resulting in a total of 48 signals. In this example, only four different wavelengths are needed in the WDM scheme. The space division multiplexing employs 3-core fibers from the base transceiver stations to the remote note, each core of the 3-core fiber carrying four WDM signals. At the remote note the signals from the base stations are collected in a 12-core fiber and transmitted to the central station where the MIMO signal processing takes place, again each core of the 12-core fiber carrying four WDM signals totaling to the 48 signals.

The key advantages of such architecture with WDM+SDM using multicore fibers is:
Possible use of uncooled VCSELs
WiMax/WiFi/Whitespaces/LTE compatible
Transparency to the wireless modulation format
Energy efficient optical front-end
Straight-forward scaling to larger architectures

The invention claimed is:

1. A radio-over-fibre MIMO communication system comprising
  one or more base transceiver stations comprising a plurality of antenna units, an optical transmitter for converting RF signals from the antenna units into optical signals, and at least one first multiplexing unit for multiplexing said optical signals into respective individual cores of a multicore fiber, or into respective individual modes of a multimode fiber, and
  a central unit accommodating
    at least one demultiplexing unit adapted for demultiplexing the individual cores of the multicore fiber, or for demultiplexing the individual modes of a multimode fiber,
    an optical receiver for receiving the optical signals output from said at least one demultiplexing unit,
    at least one processing unit for processing the signals from said optical receiver,
wherein said optical transmitter and said optical receiver are configured to perform a MIMO communication, and
wherein each of said one or more base transceiver stations are connected to the central unit by means of at least one backhaul multicore or multimode optical fiber,
  a plurality of said base transceiver stations, and
    at least one second multiplexing unit adapted for multiplexing the individual cores of the multicore optical fibers from each of said base transceiver stations into:
      (i) respective individual cores of said at least one backhaul multicore fiber, the at least one backhaul multicore fiber comprising a higher number of cores than each of the multicore optical fibers, or (ii) into respective individual modes of a backhaul multimode fiber, the backhaul multimode fiber comprising a higher number of modes than a number of cores of each of the multicore optical fibers,
wherein one or more of: (i) the at least one first multiplexing unit, (ii) the at least one second multiplexing unit and (iii) the at least one demultiplexing unit, is a space division multiplexing unit or a space division demultiplexing unit.

2. The communication system according to claim 1, wherein the plurality of antenna units are arranged in a MIMO configuration and adapted for at least one of transmission and reception of radio-frequency signals.

3. The communication system according to claim 1, wherein each base transceiver station comprises a plurality of single core optical fibers for guiding the optical signals.

4. The communication system according to claim 1, wherein the optical transmitter of said antenna units is in the form of an electro-optic conversion unit for each of said plurality of antenna units, each electro-optic conversion unit adapted for converting an RF signal into an optical signal.

5. The communication system according to claim 4, wherein each electro-optic conversion unit comprises a directly modulated laser (DML).

6. The communication system according to claim 5, wherein each electro-optic conversion unit comprises an un-cooled directly modulated laser (DML).

7. The communication system according to claim 4, wherein each electro-optic conversion unit comprises an externally modulated laser.

8. The communication system according to claim 4, wherein each electro-optic conversion unit comprises a vertical cavity surface emitting laser (VCSEL).

9. The communication system according to claim 8, wherein each electro-optic conversion unit comprises an un-cooled vertical cavity surface emitting laser (VCSEL).

10. The communication system according to claim 1, wherein the plurality of base transceiver stations employs the same carrier frequencies for the radio-frequency signals.

11. The communication system according to claim 1, wherein the plurality of base transceiver stations employs the same wavelength division multiplexing scheme.

12. The communication system according to claim 1, wherein said one or more base transceiver stations are located remotely and said central unit is located at a central station.

13. The communication system according to claim 1, wherein the RF signals from the plurality of antenna units are transmitted at the same carrier frequency.

14. The communication system according to claim 1, wherein said one or more base transceiver stations comprises a base transceiver station for a wireless communication system comprising:
  a plurality of antenna units arranged in a MIMO configuration and adapted for at least one of transmission and reception of radio-frequency signals,
  an optical transmitter in the form of an electro-optic conversion unit for each of said plurality of antenna units, each electro-optic conversion unit adapted for converting an RF signal into an optical signal,
  a plurality of single core optical fibers,
  a plurality of wavelength division multiplexing units adapted for wavelength multiplexing at least two of said optical signals into one single core of one of said optical fibers for guiding the wavelength division multiplexed optical signals, and
  at least one first space division multiplexing unit adapted for space division multiplexing the wavelength division multiplexed optical signals in said single core optical fibers into respective individual cores of a multicore fiber.

15. The communication system according to claim 14, further comprising at least one multicore optical fiber in optical connection with said at least one first space division multiplexing unit.

16. The communication system according to claim 14, wherein the first space division multiplexing unit comprises at least one of a tapered fiber coupler and a fused fiber coupler.

* * * * *